(12) United States Patent
Shieh et al.

(10) Patent No.: US 6,630,067 B2
(45) Date of Patent: Oct. 7, 2003

(54) METHODS AND APPARATUS FOR BIOLOGICAL TREATMENT OF AQUEOUS WASTE

(75) Inventors: Wen K. Shieh, Wayne, PA (US); Leon Weiss, Merion, PA (US); Shu K. Tai, Jetterson Valley, NY (US)

(73) Assignee: Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/879,851

(22) Filed: Jun. 13, 2001

(65) Prior Publication Data

US 2002/0148779 A1 Oct. 17, 2002

Related U.S. Application Data

(60) Provisional application No. 60/211,302, filed on Jun. 13, 2000.

(51) Int. Cl.[7] .............................. A01K 63/04; C02F 3/30; C02F 3/06

(52) U.S. Cl. ................. 210/139; 210/150; 210/169; 210/170; 210/259; 210/615; 210/630; 210/631; 210/747; 210/903; 210/906; 210/908; 119/227; 119/260

(58) Field of Search ................. 210/605, 747, 210/614–617, 619, 630, 631, 138, 139, 150, 151, 170, 252, 259, 903, 906, 908, 909, 169; 119/227, 260

(56) References Cited

U.S. PATENT DOCUMENTS 3,939,068 A * 2/1976 Wendt et al. ............... 210/605
4,043,936 A * 8/1977 Francis et al. .............. 210/610
4,353,800 A 10/1982 Besik ........................ 210/605

(List continued on next page.)

FOREIGN PATENT DOCUMENTS

JP         6-23390    *  2/1994

OTHER PUBLICATIONS

Knowles, R., "Denitrification," *Microbiol. Rev.* 46:43–70, American Society for Microbiology (1982).

McClintock, S.A., et al., "Nitrate versus oxygen respiration in the activated sludge process," *J. Wat. Poll. Cont. Fed.* 60:342–350, Water Pollution Control Federation (1988).

Monteith, H.D., et al., "Industrial Waste Carbon Sources for Biological Denitrification," *Prog. Wat. Tech.* 12:127–141, Pergamon Press Ltd. (1980).

Nguyen, V.T. and Shieh, W.K., "Anoxic and Oxic Biological Fluidized Bed Treatment of Amines and Phenol," *Wat. Sci. Tech.* 31:185–193, Pergamon Press Ltd. (1995).

Sharma, B. and Ahler, R.C., "Nitrification and Nitrogen Removal," *Wat. Res.* 11:897–925, Pergamon Press Ltd. (1977).

(List continued on next page.)

*Primary Examiner*—Fred G. Prince
(74) *Attorney, Agent, or Firm*—Sterne Kessler Goldstein & Fox PLLC

(57) ABSTRACT

A biofilter system of the present invention utilizes an Alternating-Aerobic-Anoxic (AAA) process in a single reactor to provide efficient and cheap removal of carbonaceous materials, nitrogenous materials, and/or mixtures thereof from aqueous waste. The biofilter system of the present invention is particularly suitable for treating aqueous waste from aquaculture, industrial processes and animal husbandry. The biofilter system includes: a main biofilter chamber containing therein aerobic and anaerobic bacteria without physical separation; an inlet port and an outlet port connected to the main biofilter chamber; and a means for oxygenating the aerobic and anaerobic bacteria in the main biofilter chamber, including means for timing the oxygenation of the aerobic and anaerobic bacteria to provide alternating periods of high-oxygen conditions and anoxic conditions.

17 Claims, 3 Drawing Sheets

U.S. PATENT DOCUMENTS

| | | | | |
|---|---|---|---|---|
| 4,421,648 A | | 12/1983 | Besik .......................... 210/605 |
| 4,442,005 A | | 4/1984 | Breider ....................... 210/614 |
| 4,461,708 A | * | 7/1984 | Hakulinen et al. .......... 210/605 |
| 4,551,250 A | * | 11/1985 | Morper et al. ............... 210/603 |
| 4,859,341 A | | 8/1989 | Schreiber ..................... 210/614 |
| 4,968,427 A | * | 11/1990 | Glanser et al. .............. 210/610 |
| 4,971,698 A | * | 11/1990 | Weber et al. ................ 210/615 |
| 4,995,980 A | * | 2/1991 | Jaubert ........................ 210/602 |
| 4,999,111 A | | 3/1991 | Williamson ................. 210/605 |
| 5,022,993 A | | 6/1991 | Williamson ................. 210/605 |
| 5,076,928 A | | 12/1991 | Ballnus ....................... 210/605 |
| 5,078,882 A | * | 1/1992 | Northrop ..................... 210/617 |
| 5,232,582 A | * | 8/1993 | Takahashi et al. ............. 210/86 |
| 5,242,592 A | | 9/1993 | Ballnus ....................... 210/605 |
| 5,348,653 A | | 9/1994 | Rovel .......................... 210/605 |
| 5,413,713 A | * | 5/1995 | Day et al. .................... 210/605 |
| 5,466,373 A | * | 11/1995 | Handwerker et al. .. 204/157.15 |
| 5,599,451 A | * | 2/1997 | Guiot ........................... 210/605 |
| 5,611,927 A | | 3/1997 | Schmid ....................... 210/605 |
| 5,624,562 A | | 4/1997 | Scroggins ................... 210/605 |
| 5,626,754 A | | 5/1997 | Ballnus ....................... 210/605 |
| 5,628,905 A | * | 5/1997 | Montalbano ................. 210/615 |
| 5,702,572 A | * | 12/1997 | Fujimura et al. ........... 210/605 |
| 5,711,020 A | | 1/1998 | Wolfe et al. ................. 588/203 |
| 5,736,047 A | | 4/1998 | Ngo ............................ 210/602 |
| 5,776,344 A | * | 7/1998 | McCarty et al. ............. 210/605 |
| 5,942,108 A | | 8/1999 | Yang ....................... 210/195.3 |
| 5,985,148 A | * | 11/1999 | Liu .............................. 210/609 |
| 6,033,559 A | | 3/2000 | Bender et al. ............... 210/150 |
| 6,033,570 A | * | 3/2000 | Grise .......................... 210/605 |
| 6,039,873 A | * | 3/2000 | Stahler ........................ 210/605 |
| 6,100,382 A | | 8/2000 | Wolfe et al. ................. 530/370 |
| 6,106,718 A | | 8/2000 | Maneshin et al. ........... 210/614 |
| 6,117,313 A | | 9/2000 | Goldman et al. ............ 210/151 |
| 6,143,187 A | | 11/2000 | Robertson .................... 210/786 |
| 6,171,480 B1 | | 1/2001 | Lee et al. ....................... 210/85 |
| 6,183,643 B1 | * | 2/2001 | Goodley ....................... 210/605 |

OTHER PUBLICATIONS

Shieh, W.K., et al., "Predicting reactor biomass concentration in a fluidized–bed system," *J. Wat. Poll. Cont. Fed.* 53:1574–1584, Water Pollution Control Federation (1981).

Shieh, W.K. and Keenan, J.D., "Fluidized Bed Biofilm Reactor for Wastewater Treatment," *Adv. Biochem. Eng. Biotechnol.* 33:132–169, Springer–Verlag (1986).

Shieh, W.K. and Hsu, Y., "Biomass Loss from an Anaerobic Fluidized Bed Reactor," *Wat. Res.* 30:1253–1257, Pergamon Press Ltd. (1996).

Tai, S.–K., "Study of the Alternating–Aerobic–Anoxic (AAA) Process in a Single–Reactor Biological Fluuidized Bed System," Doctoral Dissertation pp. 1–147, University of Pennsylvania (1998).

Wiesmann, U., "Biological Nitrogen Removal from Wastewater," *Adv. Biochem. Eng. Biotechnol.* 51:113–154, Springer–Verlag (1994).

Yee, C.J., et al., "Effects of Microcarrier Pore Characteristics on Methanogenic Fluidized Bed Performance," *Wat. Res.* 26:119–1125, Pergamon Press Ltd. (1992).

* cited by examiner

METHODS AND APPARATUS FOR BIOLOGICAL TREATMENT OF AQUEOUS WASTE

CROSS-REFERENCE TO RELATED APPLICATIONS

This application claims the right of priority under 35 U.S.C. §119 to U.S. Provisional Appl. No. 60/211,302 filed on Jun. 13, 2000, the entirety of which is incorporated by reference herein.

BACKGROUND OF THE INVENTION

1. Field of the Invention

The present invention is directed towards a more efficient and less expensive process for biological treatment of aqueous waste and raw animal waste.

2. Background Art

A balanced nitrogen cycle is important to our environment. However, many human activities have perturbed the nitrogen cycle and caused nitrogenous pollution and environmental problems. Fertilizer production, farming of leguminous crops, and fossil fuel combustion contribute to an annual anthropogenic nitrogen fixation of 90, 40 and 20 Tg(N)/yr, respectively. Thus, the overall amount of nitrogen fixation contributed by human activity essentially equals the annual total of naturally-occurring nitrogen fixation, i.e., approximately 130 Tg(N)/yr.

Intake of high-nitrate food (e.g., highly fertilized vegetable, livestock fed with high-nitrate forage material or aquacultural production from an aqueous environment of high nitrate concentrations) has been correlated with increased risk to human health. Nitrate poisoning results from the conversion of nitrate to nitrite in the body. Absorption of nitrite into the blood stream produces abnormal hemoglobin (methemoglobin), which is incapable of transporting oxygen. Nitrates in water or meat are especially hazardous to young infants because their relatively high gastric pH facilitates the reduction of nitrate to nitrite by bacteria causing blue baby syndrome. Nitrite can interact with substrates such as amine and amide to produce N-nitroso compounds including nitrosamines, many of which may cause cancer in many animal species.

Ammonia ($NH_4^+$) is recognized as a toxic compound by the National Institute for Occupational Safety and Health (NIOSH) and the Occupational Safety and Health Administration (OSHA). A number of ammonium compounds, i.e., ammonium acetate, ammonium chloride, ammonium nitrate, ammonium sulfide, etc., are also toxic to human beings. Ammonium ions in drinking water, where ammonium ions exist in equilibrium with ammonia and hydrogen ions, may not only cause toxicity but also reduce the disinfecting efficiency of chlorine. Adding additional chlorine to compensate for the presence of ammonia will also cause over-disinfection problems such as producing by-products (e.g. trihalomethanes and total organic halogens), tastes and odors, accelerating corrosion, and increasing costs.

The present invention is directed to an efficient and cheap process of removing $NH_3/NH_4^+$, $NO_2^-$, and $NO_3^-$ from aqueous waste. The traditional biological treatment process uses oxidation methods to remove ammonium. However, oxidation of ammonium does not truly remove it but transforms it into $NO_2^-$, and $NO_3^-$, both of which still remain in the system. A biofilter system of the present invention utilizes an Alternating-Aerobic-Anoxic (AAA) process in a single biological fluidized bed reactor to provide efficient and cheap removal of carbonacious materials, nitrogenous materials and/or mixtures thereof from aqueous waste. This system has great economic advantages over other current nitrogen removal technologies and is believed to be the star of tomorrow. The biofilter system of the present invention is particularly suitable for treating aqueous waste resulting from aquaculture, industrial processes and animal husbandry.

BRIEF SUMMARY OF THE INVENTION

The present invention is directed to a biofilter system for removal of carbonaceous matter, nitrogenous matter, and/or mixtures thereof, from an aqueous source. The biofilter system includes a main biofilter chamber containing therein aerobic and anaerobic bacteria without physical separation; an inlet port and an outlet port connected to the main biofilter chamber; and a means for oxygenating the aerobic and anaerobic bacteria in the main biofilter chamber, including means for timing the oxygenation of the aerobic and anaerobic bacteria. The means for oxygenating the bacteria may include a pump, an agitator and/or an air diffuser. The biofilter system may further comprise a disinfection unit, such as, an ozonizer utilizing ultraviolet light. In one embodiment, the biofilter system may further comprise means for measuring the level of any one of oxygen, nitrogen, organic carbon, phosphate and pH.

In the biofilter system of the present invention, the bacteria in the biofilter chamber can be carried by a solid support, such as, for example, a biotower, a rotating biological contactor, rough stones, slats, plastic media, a reticulated foam particle, a microcarrier and/or media particles. In a preferred embodiment, the bacteria are carried by anionic and hydrophilic media particles having a rough surface, such as ceramic spheres, with a diameter less than 1 mm, or more preferably, either less than 0.8 mm or less than 0.6 mm. In the alternative, the bacteria can be present in the biofilter in suspension, free of a solid support. It is contemplated that the bacteria used in the biofilter system of the present invention are capable of growth in aminobenzene, phenol, monoethylamine, diisopropylamine, and/or mixtures thereof.

Another aspect of the invention provides a method for removal of carbonaceous matter, nitrogenous matter, and/or a mixture thereof from an aqueous source, wherein the removal is carried out by flowing the aqueous source through a biofilter system of the present invention. Accordingly, the method of the present invention includes the steps of: contacting in a biofilter chamber an aqueous waste with a mixture of aerobic and anaerobic bacteria; providing high-oxygen conditions; providing anoxic conditions; alternating the step of providing high-oxygen conditions and the step of providing anoxic conditions; and monitoring an outflow from the biofilter chamber for predetermined levels of carbonaceous matter, nitrogenous matter or mixtures thereof.

In one embodiment, the outflow is monitored for one or more of nitrogen content, phosphate content, and organic carbon content. The method of the present invention may further comprise the step of recirculating the contents of the biofilter chamber. In another embodiment, the high-oxygen conditions during the high-oxygen periods are uniform throughout the biofilter chamber. In a further embodiment, the high-oxygen conditions are provided with predetermined periodicity. It is contemplated that high-oxygen and anoxic conditions are provided in alternate periods, wherein, for example, each period lasts between 1 and 12 hours. In a preferred embodiment, each of the periods lasts between 2 and 9 hours, most preferably with each high-oxygen period lasting between 3 and 7 hours, and each anoxic period lasting between 3 and 9 hours.

It is preferred that the biofilter system reduce the amount of carbonaceous matter, nitrogenous matter, and/or mixtures thereof in the outflow to no less than approximately 80% of the original amount of carbonaceous matter, nitrogenous matter, or mixtures thereof in the aqueous source. It is more preferred for the amount to be reduced by no less than approximately 90%.

According to the method of the present invention, the bacteria utilized in the biofilter chamber should be capable of growth in aminobenzene, phenol, monoethylamine, diisopropylamine, or mixtures thereof. In one embodiment, the bacteria may be carried in the biofilter chamber on a solid support, such as, for example, a biotower, a rotating biological contactor, rough stones, slats, plastic media, a microcarrier, and/or media particles. In a preferred embodiment, the bacteria are carried by anionic and hydrophilic media particles having a rough surface, such as ceramic spheres, with a diameter less than 1 mm, or more preferably with a diameter either less than 0.8 mm or less than 0.6 mm. The bacteria may also be present in the biofilter system in suspension, free from a solid support.

It is contemplated that the methods of the present invention are suitable for removal of carbonaceous matter, nitrogenous matter, matter containing phosphate, and/or mixtures thereof from aqueous waste generated by, for example, aquaculture or industrial processes. The aquaculture may be carried out in, for example, a tank, a natural pond or lake, a man-made pond or lake, or cages in open waters. Possible industrial processes include, for example, effluents from the tanning industry, the defense industry (e.g. munitions production), the food industry, the agriculture industry and the chemical industry (e.g. manufacturing of fertilizers).

An aquaculture system of the present invention includes: an aqueous environment; a means for fluidly connecting the aqueous environment with a biofilter system of the present invention; a means for disinfecting an outflow of the biofilter system; and a means for returning the disinfected outflow to the aqueous environment. The biofilter system for aquaculture may further include a pump, and/or means for filtering an outflow from the aqueous environment prior to the outflow entry into the biofilter system. Accordingly, the aqueous environment may be a tank, a man-made pond or lake, a natural pond or lake, or cages in open waters. The present invention is most particularly directed to a method of aquaculture wherein fish are grown in the aqueous environment described herein and the aqueous waste resulting from the aquaculture is treated by the method for removal of carbonaceous matter, nitrogenous matter, matter containing phosphate, and/or mixtures thereof as described above.

The present invention is further directed towards a biofilter system for treating animal waste. A biofilter system for treating animal includes: a first vessel having a first inlet port and a first outlet port, wherein the first vessel contains means for degrading waste solids within the animal waste and means for separating solid and liquid animal wastes; and a second vessel having a biofilter system of the present invention, including a second inlet port fluidly connected to the first outlet port of the first vessel. It is contemplated that the effluent from the first vessel is aqueous.

The present invention is also directed towards a method of removing carbonaceous matter, nitrogenous matter, matter containing phosphate, and/or mixtures thereof from animal waste, by passing the waste through the biofilter system of the present invention. It is preferred that the biofilter system reduce the amounts of carbonaceous matter, nitrogenous matter, matter containing phosphate and/or mixtures thereof in the outflow by no less than approximately 80% of the original amounts in the untreated aqueous waste. Most preferably, the amount is reduced by no less than approximately 90%. It is contemplated that the method of the present invention is useful for treatment of waste of any animal, preferably a farm animal, such as, for example, a pig, a horse, a goat, a sheep, a cow, a chicken, a turkey, an ostrich, an emu, a llama or an alpaca. The biofilter system of the present invention is suitable for treatment of animal waste comprising no more than approximately 10% solid waste. Preferred, is 5% solid waste, and most preferred is less than approximately 1% solid waste.

BRIEF DESCRIPTION OF THE FIGURES

Further features and advantages of the present invention, as well as the structure and operation of various embodiments of the present invention, are described in detail below with reference to the accompanying drawings. The accompanying drawings further serve to explain the principles of the invention and to enable a person skilled in the pertinent art to make and use the invention

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

The following description is modified from Tai, S. K. (1998) "Performance and Kinetics of Alternating, Anoxic/Oxic Fluidized Bed Reactors," Ph.D. Dissertation, University of Pennsylvania, Pa., incorporated herein in its entirety.

Figure 1:
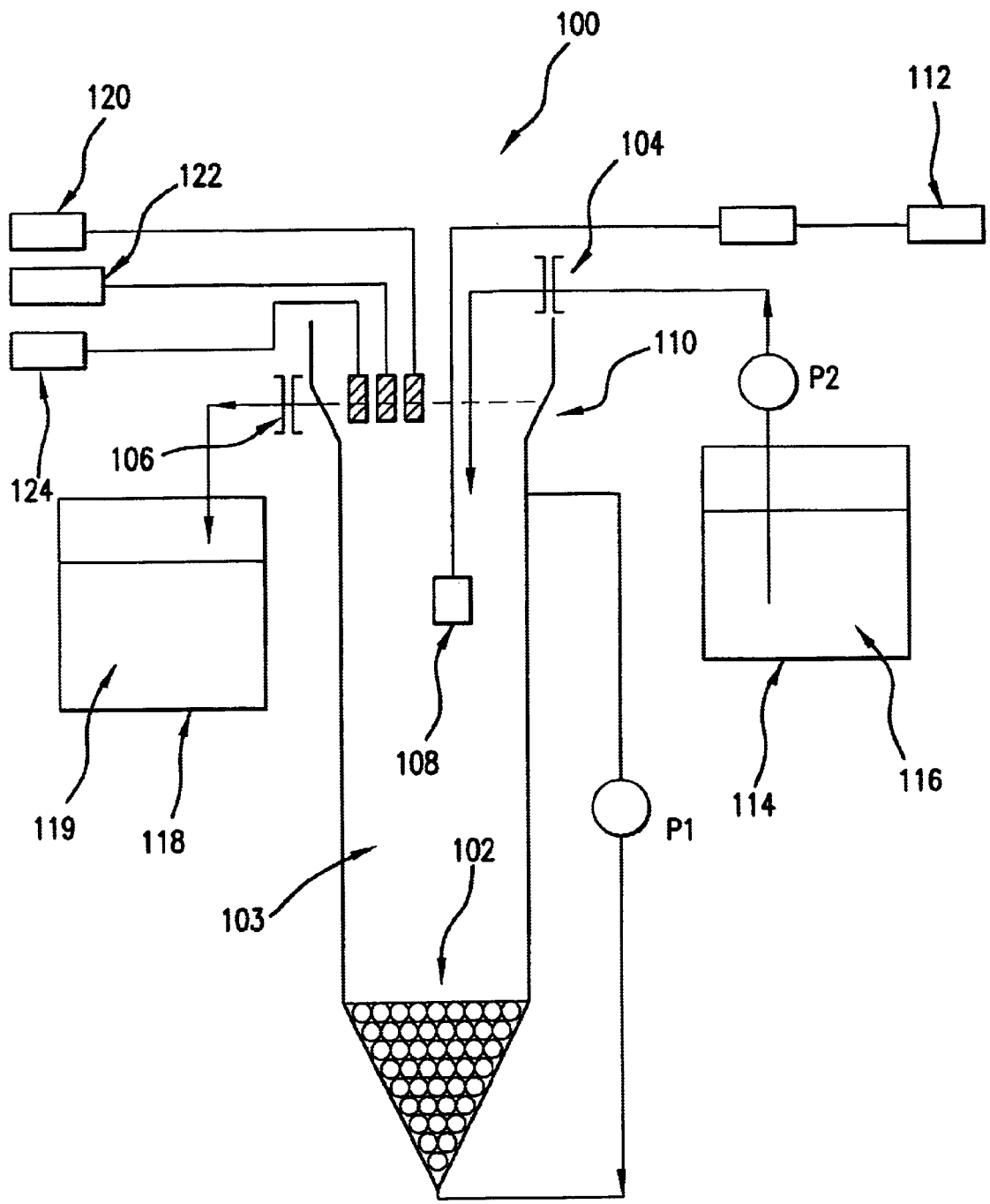
FIG. 1: Schematic representation of a biofilter system according to the present invention.

As shown in FIG. 1 a biofilter system 100 includes a main biofilter chamber 110 containing therein anaerobic and aerobic bacteria 102 without physical separation. An inlet port 104 and an outlet port 106 are each connected to main biofilter chamber 110. Means for oxygenating the anaerobic and aerobic bacteria 108 includes a means for timing oxygenation, 112. Oxygenating means 108 may be a pump, an agitator, and/or an air diffuser. However, it is contemplated that other oxygenating means known in the art are suitable for use with the biofilter system of the present invention.

The biofilter system of the present invention includes an aqueous waste holding tank 114 for holding liquid waste 116 and/or an effluent collection tank 118 for collecting treated effluent 119 released from main biofilter chamber 110. The biofilter system of the present invention may further include a first pump P1 for recirculating the contents of main biofilter chamber 110, and/or a second pump P2 for pumping the liquid waste into the biofilter chamber. The biofilter system may also include a means for measuring any one of pH, oxygen, nitrogen, organic carbon and/or phosphate, as represented by reference numerals 120, 122 and/or 124 in FIG. 1.

It is contemplated that bacteria 102 in biofilter system 100 may be carried by a solid support, such as, for example rough stones, slats, plastic media, microcarriers, media particles, a biotower, or a rotating biological contactor. Alternatively, bacteria 102 may grow in suspension, free of solid support.

In general, the biofilter system of the present invention operates as follows. Liquid waste 116 is pumped by pump P2 from aqueous waste holding tank 114 into main biofilter chamber 110 via inlet port 104. A biofilter content 103 of main biofilter chamber 110 is periodically oxygenated by means for oxygenation 108. Biofilter content 103 is circulated through bacteria 102 by recirculation pump P1.

As previously described, bacteria 102 includes aerobic and anaerobic bacteria, which are subjected to alternating high oxygen conditions and anoxic conditions. Depending on the condition and type of bacteria, the bacteria act to "cleanse" the biofilter content 103 of carbonaceus matter, nitrogenous matter, and/or mixtures thereof. Biofilter content 103 may be monitored for desirable levels of oxygen, organic carbon, nitrogen and/or phosphate, as well as pH. Once biofilter content 103 is properly treated, it is released as effluent 119 through outlet port 106 of main biofilter chamber 110 to effluent collection tank 118. Effluent 119 may also be monitored for desirable levels of organic carbon, nitrogen and/or phosphate, and may be recirculated into biofilter chamber 110 if the desirable levels are not detected.

Figure 2:
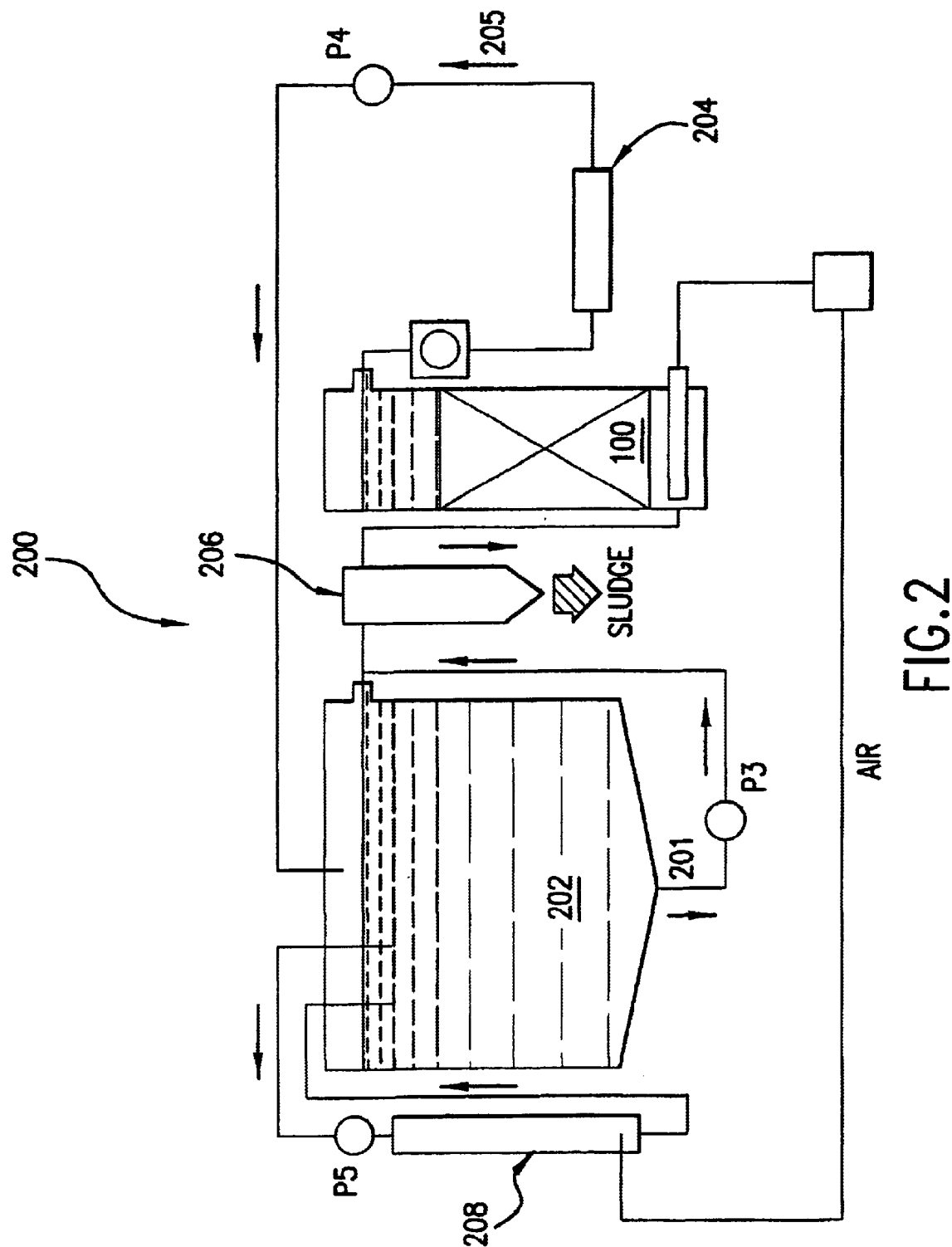
FIG. 2: Schematic representation of an aquaculture system utilizing the biofilter system of FIG. 1 according to the present invention.

As shown in FIG. 2, an aquaculture system 200 of the present invention comprises an aqueous environment 202, fluidly connected to a biofilter system 100 of the present invention. The outflow of biofilter system 100 flows through a means for disinfecting 204 and is thereafter returned to aqueous environment 202. Aquaculture system 200 may further comprise, a pump P3 for pumping aqueous waste outflow 201 of aqueous environment 202 into biofilter system 100 and/or a pump P4 for pumping disinfected outflow 205 back into aqueous environment 202. Aquaculture system 200 may further include a means for filtering solid debris 206. The solid debris filtering means 206 is located between aqueous environment 202 and biofilter system 100 to remove debris from the aqueous waste such that the aqueous waste is prefiltered prior to entering biofilter system 100. Means for filtering solid debris 206 may include, for example, a cyclone and/or a microstrainer. Other means for filtering solid debris, well known in the art, are also contemplated for use with the aquaculture system of the present invention.

The aquaculture system may further utilize an oxygenator/carbon dioxide stripper 208, with or without a pump P5, connected to aqueous environment 202. In a preferred embodiment, the oxygenator/carbon dioxide stripper 208 may also be connected to biofilter system 100 providing the means for oxygenating 108 bacteria 102 of biofilter main chamber 110, as shown in FIG. 1.

Figure 3:
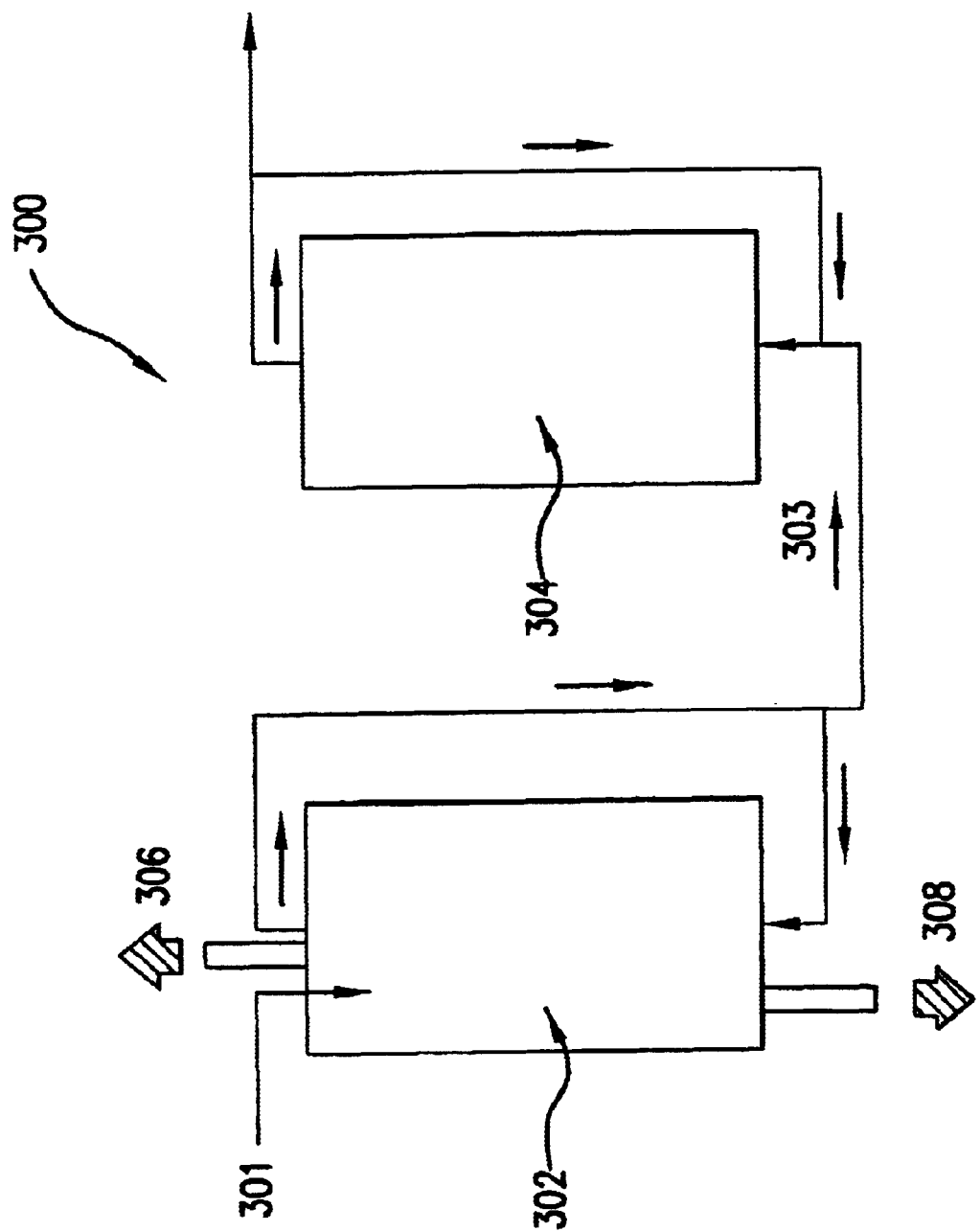
FIG. 3: Schematic representation of an animal waste treatment system utilizing the biofilter system of FIG. 1 for treating animal waste according to the present invention.

Another embodiment of the present invention is an animal waste treatment system 300 that utilizes a biofilter system 100 for treating animal waste 300, as shown in FIG. 3. In this embodiment, a solid and liquid animal waste slurry 301 is introduced into a first vessel 302 where the solids are further degraded, producing a biogas, such as methane. Means for degrading solids in the animal waste slurry may include enzymatic digestion, mechanical shearing, and any other method known in the art for degrading solid waste. First vessel 302 preferably contains a means to separate solid and liquid waste (not shown). Means for separating solid and liquid wastes includes filtering, centrifuging, and any other method known in the art for separating solids and liquids. A liquid animal waste 303 is passed into a second vessel 304 which includes a biofilter system 100 of the present invention.

In one embodiment, an animal waste treatment system 300 of the present invention can further comprise means for capturing the biogas 306 (not shown). Such biogas capturing means are well known to those of ordinary skill in the art. In another embodiment, first vessel 302 also utilizes a means for discarding waste solids 308 (not shown) to degrade waste solids which remain after the degradation process.

Treatment technologies of nitrogen removal vary with different nitrogenous compounds. A list of these technologies are shown in Table 1 below. Among them, biological treatment is considered the most advantageous method due to its efficiency, simplicity and low cost. For the biological treatment, two major biological mechanisms, nitrification and denitrification, are responsible for the transformation of $NH_3/NH_4^+$, and $NO_3^-$ in the presence of appropriate bacteria. Based on characteristics of the bioreactor, the biological methods can be categorized into three major forms: suspended-growth reactor, attached-growth reactor, and fluidized-bed reactor.

TABLE 1

Treatment technologies for nitrogen removal

| Nitrogenous compound | Removal Method | Reference |
|---|---|---|
| $NH_3$ | Air Stripping | Diamadopoulos, 1994 |
| $NH_3$ | Dielectric barrier discharges (DBDs) | Chang and Tseng, 1996 |
| $NH_3/NH_4^+$ | Artificial wetland | Sumrall et al., 1994; Farahbakhshazad and Morrison, 1997 |
| $NH_3/NH_4^+$ | Biological treatment (nitrification) | Hem, et al., 1994; Cecen and Orak, 1996 |
| $NH_3/NH_4^+$ | Ion exchange process | Lin and Wu, 1996(a) |
| $NH_3/NH_4^+$ | Electrochemical oxidation method | Lin and Wu, 1996(b) |

TABLE 1-continued

Treatment technologies for nitrogen removal

| Nitrogenous compound | Removal Method | Reference |
|---|---|---|
| $NO_2^-$ | Electrochemical oxidation method | Lin and Wu, 1996(c) |
| $NO_2^-$ | Electrochemical reduction method | Genders et al., 1996 |
| $NO_2^-$ | Biological treatment (nitrification) | Gee et al., 1990 |
| $NO_2^-$ | Biological treatment (denitrification by a submerged granular biofliter) | Rahmani, et al., 1995 |
| $NO_3^-$ | Biological treatment (denitrification by a membrane-fixed biofilm reactor) | McCleaf and Schroeder, 1995; Reising and Schroeder, 1996; Fuchs, et al., 1997 |
| $NO_3^-$ | Biological treatment (denitrification by a fluidized-bed reactor) | Liessens, et al., 1993; Lazarova, et al., 1994 |
| $NO_3^-$ | Electrochemical reduction method | Genders et al., 1996 |
| $NO_3^-$ | Ion exchange | Van der Hoek and Klapwijk, 1989; Clifford and Liu, 1993; Brown, 1995 |
| $NO_x$ (NO and $NO_2$) | Ammonia radical (plasma) injection process | Chess, et al., 1995 |

In a suspended-growth reactor, the biological sludge (microorganisms) and wastewater (containing organic and mineral compounds as food for microorganisms) are mixed. The mixture is usually agitated and aerated, and, under such conditions, growth of microorganisms is stimulated. The individual organisms gradually clump together (flocculate) and form an active mass of microbes (activated sludge).

In an attached-growth reactor, there are essentially three types of attached-growth processes which utilize solid supports, i.e., trickling filter, biotower and rotating biological contactor (RBC). In such settings, microorganisms attach and live on the medium and extract the nutrient from the wastewater flow (a process of removing chemical compounds from the wastewater) passing by them. A trickling filter is a bed of course material (e.g., stones, slats and plastic media) and wastewater is passed through it. Biotowers are also trickling filters, but in the shapes of high towers. A RBC uses flat disks that range in diameter from 2 to 4 m and up to 1 cm in thickness as the solid support for microorganisms to attach. The disks are mounted on a common shaft that rotates at approximately 1 to 2 rpm. Trickling filters and biotowers are typical fixed-biofilm reactors, while a RBC is treated as a special adaptation of the attached-growth process.

A fluidized-bed reactor is similar to the attached-growth reactor in also being a biofilm reactor. However, the difference between the attached-growth reactor and the fluidized-bed reactor is that the biofilm media of the latter are not fixed but fluidized. The advantages of a fluidized-bed reactor over suspended-growth and attached-growth reactors include: high biomass concentrations and surface areas, less susceptibility to sudden changes in load or temperature, successful carbon and nitrogen removal from municipal wastewater, the elimination of any problems and costs caused by sludge, and less expense based on savings in reactor space and rapid treatment time. The fluidized-bed reactor is 18 times more efficient than the packed-column (attached-growth) reactor in terms of nitrate removal of per unit reactor volume. A comparison between suspended-growth and fluidized-bed reactors showed the fluidized-bed process can obtain the same level of treatment in less than 5 percent of the space and 5 percent of the time required for a three-sludge system.

The biological fluidized-bed (BFB) reactor was first developed for denitrification of nitrified sewage effluents. Later on, they were applied to carbonaceous oxidation and nitrification of settled sewage. The BFB reactor was used in an number of studies on nitrification.

The media of a BFB reactor usually have a light weight and a size in the range of 0.2 to 1.0 mm. At the beginning of operating a BFB reactor, the particles are expanded in a column by an upward flow of recirculation to the point at which the upward force is equal to the downward gravity. However, as the bacteria grow as a biofilm around the particle, increasing biofilm volume will continue to expand the bed. Therefore, at the steady state, where cell growth equals the rate the cells are washed off by the surface sheer, the bed may be at an undesirable height. As a result, to remove the excess biomass, particles should be taken out of the reactor and washed when needed.

The alternating-aerobic-anoxic (AAA) process has two process reactions, i.e., an aerobic process and an anoxic process. Under the aerobic conditions, $NH_4^+$ (or also $NO_2^-$—N) is first biologically oxidized to $NO_3^-$—N via nitrification. In the next anoxic stage, $NO_3^-$—N is denitrified and the end product is nitrogen gas. Because these two reactions have opposite demand for oxygen, each reaction cannot occur simultaneously in the same reactor. Therefore, each reaction must occur in either an alternate space or time.

Initially, the AAA process was developed in a configuration of spatial alternation. In such a process, nitrification and denitrification occurs individually in physically separate zones of the tank or separate tanks of the system. This idea mainly originated from the success of efficient nitrogen removal by building aerobic and anaerobic zones in sequence in the treatment system. Designs combining nitrification and denitrification stages in various spatial configurations have been studied and applied in many treatment systems. Two different three-stage systems featured continuous stages of carbonaceous removal, nitrification, and denitrification in space. One approach known in the art utilized a supplemental organic carbon source, but another approach eliminated this need by introducing the influent organic matter into the denitrification basin. The latter approach utilized a single reactor-clarifier system with sequential basins in the order of anaerobic, aerobic, anaerobic, and aerobic. This process, known as Bardenpho, can remove 90 to 95% of nitrogen and precipitate up to 97% of phosphorus without external supply of organic carbon. The combined N/D (Nitrification/Denitrification) system uses the first two stages of the Bardenpho process and its removal efficiency was evaluated at 97% of the influent total kjedhal nitrogen (TKN) and 93% of the influent chemical oxygen demand (COD).

A more recent AAA process includes periodic aeration in the system. In 1975, a two-basin, single-sludge system was proposed. This system creates an alternating aerobic-anoxic environment in each basin for efficient nitrogen removal and shares much similarity with the later successful model of BIODENIPHO 9. BIODENIPHO is the trademark for the patented process developed by I. Kruger Systems and the Department of Environmental Engineering at the Technical University of Denmark. The BIODENIPHO process contains two aerobic/anoxic tanks and performs nitrification and denitrification in a semi-batch manner by periodically aerating the tanks and changing the path of flow.

Although the treatment target of a AAA process is $NH_2^+$, it is also true that phosphorus removal can be accomplished in the AAA process. The phosphorus removal process usually contains an anaerobic stage, where no nitrate and dissolved oxygen should exist, followed by an aerobic stage, where PHB (poly-$\beta$-hydroxybutyrate) is oxidized and excess phosphate is moved by the bio-P (biological phosphorus removal) bacteria. Based on the above conclusion, a typical spatial alteration process for removing both phosphorus and nitrogen is usually composed of an anaerobic tank, an anoxic tank and finally an aerobic tank.

The kinetic model for the complete mixed AAA process is based on the structured biomass model and assumes that the heterotrophic biomass within this system is divided into three components—stored mass, active mass, and inert mass. Their production rates are described by the Monod function. Two important process variables are emphasized in this model. One is the aeration fraction (AF), which determines the ammonia and nitrate level. The other one is the cycle time ratio (CTR, or the ratio of cycle time to HRT). For example, one AAA system has a 2-hour-on and 2-hour-off cycle and an HRT of 16 hours, so the CTR is (2+2)/16 or 0.25. CTR represents the degree of non-steady-state conditions by intermittant aeration. A simplified form of this earlier model assumes first-order rate equations for carbon oxidation (aerobic and anaerobic) and nitrification.

A simplified ASM1 (Activated Sludge Model No. 1) was used to describe the nitrogen dynamic in the BIODENIPHO system. ASM1 was developed by the International Association on Water Pollution Research and Control (IAWPRC) task group and became the standard model of the single-sludge system for carbonaceous removal, nitrification and denitrification. It consists of seven basic processes: aerobic growth of autotrophic biomass, aerobic growth of heterotrophic biomass, anoxic growth of heterotrophic biomass, decay of autotrophic biomass, decay of heterotrophic biomass, hydrolysis of entrapped particulate organic matter, and hydrolysis of entrapped organic nitrogen. By using this model, a novel control strategy for improved nitrogen removal in an alternating activated sludge process was possible.

Mathematical modeling and computer simulations were used to modify ASM1 for a bench-scale activated sludge reaction system. The major differences between ASM1 and this modified model are the state variables of dissolved oxygen (DO) and nitrite, the distinction between aerobic heterotrophic yield and anoxic heterotrophic yield, and the correlation between temperature, pH (and alkalinity), and the process kinetics. It was proved that prediction by this revised model agrees well with the experimental data.

According to the present invention, the AAA process is combined with a single-reactor biological fluidized bed system. The biological fluidized bed system, with great advantages of less space and no sludge, is becoming very important to the future practice of the AAA process.

The major feature of the AAA process is alternating aeration. A proper combination of aeration and non-aeration time is crucial to an optimal performance of the AAA process. For an easily biodegradable organic carbon source (e.g., glucose), free ammonium can be removed efficiently at aeration/non-aeration ratios, different aeration or non-aeration time may cause the AAA process to perform differently, depending on how the aeration or non-aeration time affects it. For example, 4-hr on/2-hr off, with the ratio of 2, has insufficient non-aeration time (2 hours) for complete denitrification. Although 9-hr on/4-hr off has a ratio of 2.25, its non-aeration period (4 hours) is increased and greatly improves total nitrogen removal of the AAA process.

As for a slowly biodegradable (under anoxic conditions) organic carbon source (e.g., aniline), which has a low denitrification rate, the non-aeration time should be accordingly increased. Consequently, an aeration/non-aeration ratio less than 1 is a common design parameter for the AAA process. The disadvantage of a long aeration duration, causing reduction of aeration/non-aeration ratio, is to produce more $NO_3^-$—N than the denitrification process can reduce.

This invention provides processes incorporating the AAA process in removing complex organic compounds, such as, for example aniline or aminobenzene. Aniline is a complex toxic compound which is used in a number of industrial manufacturing processes. As the regulation of effluent toxicity is getting much stricter, the current invention, which provides economic and efficient ways to detoxify a broader range of toxic and hazardous compounds, can be of great commercial benefit in industry.

Aquaculture has been growing fast in recent years for two reasons: shortage of naturally-occuring seafood stocks caused by human activities, e.g., ocean pollution, overfishing, etc., and increased demand for fish. Aquaculture requires purity of water, and generates nitrogenous and organic aqueous waste. It is known that ammonia and nitrous acid ($HNO_2$) are toxic to fish and a high nitrate concentration may cause fish to develop Pseudomonas skin infections. The present invention solves the problem of nitrogenous ($NH_4^+$, $NO_2^-$—N and $NO_3^-$—N) pollution caused by a high density of fish, such as, for example bass or tilapia. An aquaculture system according to the present invention removes excess organic and nitrogenous waste, and recycles the water in the aquaculture environment, creating a more efficient and economic aquaculture system.

In a further embodiment of the present invention, biofiltration is used to purify raw animal waste. Accordingly, the solids in the raw waste may first be degraded, and the resulting liquid (aqueous) waste is then purified by the methods of the present invention. The degradation of the solids in the raw waste can be accomplished by a variety of techniques, such as, for example, shredding, enzymatic degradation, homogenizing, and other techniques well known to those of ordinary skill in the art. Particulate matter may also be removed from liquid waste.

In a preferred embodiment, the animal waste treatment system of the present invention is physically enclosed. The advantages of such systems include reduced odor, reduced possibility of contaminated surroundings and reduced possibility of overflow due to, for example, rain.

It will be readily apparent to one of ordinary skill in the relevant art that other suitable modifications and adaptations to the methods and applications described herein may be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

Example 1

Experimental Material and Analytical Equipment

Experimental materials and analytical equipment were used to create an example of a biofilter system according to the present invention.

Air Diffuser: Made of wood and purchased from a regular aquarium store.

Air Pump: The model of Silenger by Penn-Plax (Garden City, N.Y.).

ChronTrol XT: The ChronTrol XT (ChronTrol Corporation, San Diego, Calif.) is a programmable, microprocessor-based timing device. It can easily be programmed to switch circuits on and off at specific times and dates, for durations, on a cycle, or from external devices attached to its optional input connector. In this example, the ChronTrol XT is used to adjust the aeration modes and feeding rates.

Constant Temperature Cabinet (Stabil-Therm) and Muffle Furnace (M15a-2A): Both models are made by Blue M (Blue Island, Ill.). Measurement of mix liquid volatile suspended solids (MLVSS) and attached volatile suspended solids (AVSS) will follow the standard method 2540 E (17th edition, 1989).

DC-80 Total Organic Carbon Analyzer: A modular TOC analysis system made by Rosemount Analytical, Inc. (Santa Clara, Calif.). It is equipped along with Balston 78-30 TOC Gas Generator (Balston Inc., Havenhill, Mass.). Before injection, filtered sample is acidified with phosphoric acid and sparged for a few minutes to remove inorganic carbon. Injection volume is 200 μl for the detection range of 10–800 mg/l TOC. Oxidation reagent is made of 20 grams of Potassium Persulfate ($K_2S_2O_8$) dissolved in 1 liter of reagent water and then added 1 ml of concentrated phosphoric acid. TOC is oxidized by ultraviolet promoted persulfate oxidation and measured by infrared detection.

DR/4000 Spectrophotometer: Manufactured by HACH (Loveland, Co.) and is used for measuring $NH_3$—N, $NO_2^-$ and $NO_3^-$; Salicylate Method is used for measuring $NH_3$—N at the concentration level of both 0 to 2.5 mg/l $NH_3$—N and 0 to 50.0 mg/l $NH_3$—N. Diazotization Method is USEPA approved and wastewater analysis for low range nitrite (0 to 0.3000 mg/l $NO_2^-$—N), while Ferrous Sulfate Method is for high range nitrite (0 to 250 mg/l $NO_2^-$—N). Chromotropic Acid Method is to measure nitrate in the range of 0 to 250 mg/l $NO_3^-$—N).

Feeding Apparatus: MasterFlex pump controller by the Cole-Parmer Instrument Company and clear flexible plastic laboratory tubing (TYGON®) (inside diameter of 4.8 mm and outside diameter of 7.9 mm) by the Norton Company (Wayne, N.J.).

Gel-Filled Combination pH Electrode: The ORION Gel-Filled Combination Electrode is designed for routine pH measurements under rugged conditions. The sealed reference section, permanently filled with a Kcl gel, never needs refilling. A portable pH/ISE model by ORION (Model 290A) is chosen as the meter.

Microcarrier: 70 Mesh ceramic spheres (MACROLITE®) by Kinetico Inc. (Newbury, Ohio).

Mineral Solution: It is diluted from the concentrate with distilled water before use. The concentrate contains the mineral mixture at a concentration for metabolizing 5000 ppm C by microorganisms. It is made in advance and kept in the refrigerator. The dilution ratio depends on how much carbon will be metabolized.

Recirculating Apparatus: MasterFlex pump controller and flexible tubing (NORPRENE®) (inside diameter of 7.9 mm and outside diameter of 11.3 mm), both by the Cole-Parmer Instrument Company (Vernon Hills, Ill.).

Synthetic Feeds: It is diluted from the concentrate with distilled water before use. The concentrate contains the mix of 5000 ppm of $C_6H_{12}O_6$—C and 1250 ppm of $(HN_4)_2HPO_4$—N.

Wheaton 60 Second BOD System with LED: This system (Wheaton Instruments, Millville, N.J.) is used to read the dissolved oxygen (DO) concentrations. The BOD probe has a basic construction consisting of three electrodes and a thermistor for temperature compression.

Example 2

Method of Comparing the Purification of Aqueous Waste Under Constant High-Oxygen Conditions and Under Alternating High-Oxygen and Anoxic Conditions Two biofilter systems similar to those shown in FIG. 1 and utilizing the experimental materials and analytical equipment of Example 1 were set up. One was tested under continuous aeration, and the other under alternating aeration. Feed solution consisting of approximately 50 mg/l $C_6H_{12}O_6$—C, 15 mg/l $(HN_4)_2HPO_4$—N and mineral nutrients was placed in a refrigerator. The feed solution was pumped into the reactor at a rate of approximately 4 ml/min for a length of 5 seconds at intervals of 25 seconds. The recirculation rate was about 280 ml/min, which expanded the bed height to a ratio of approximately 35 cm to 24 cm, or 1.46.

Inoculum was obtained from the activated sludge cultivated on glucose. During the period of the experiment, microorganisms may appear on the inner wall of the feeding tubing which portion is exposed in the air. Therefore, frequent cleaning of that portion of the tubing is needed. Also due to this fact, the influent concentrations should be measured at the inlet of the reactor, not from the reservoir in the refrigerator, for more realistic measurements.

Effluent was collected for 24 hours daily as a composite effluent. To reduce the influence from exposure to the open air, such acts as adding a cover or keeping at a lower temperature are helpful for stability of the composite effluent. Composite concentrations of TOC, ammonium nitrite, and nitrate in the effluent were measured. The steady state was indicated by relatively stable outcomes of the composite concentrations. The steady state of these two reactors was achieved before any analysis started.

Different aeration/non-aeration modes were applied to the AAA process: 2 hrs/2 hrs, 3 hrs//3 hrs, 4 hrs/4 hrs, 5 hrs/5 hrs, 6 hrs/6 hrs. A shift between each two aeration/non-aeration modes required an acclimation period for the microorganisms to adjust to a new environment. Comparing performances between the continuous aeration process and the AAA process was based on their nitrogen removal efficiency, which data were derived from the composite concentrations of $NH_4^+$, $NO_2^-$, and $NO_3^-$ in the effluent. For the AAA process, the kinetic study was conducted for each aeration/non-aeration cycle, in which samples were withdrawn at hourly bases from the upper liquid in the reactor for measurement of TOC, ammonium, nitrite, and nitrate concentrations. In this way, mechanisms of the nitrification and denitrification processes were investigated.

Example 3

The Results of Purifying Aqueous Waste Under Constant High-Oxygen Conditions and Under Alternating High-Oxygen and Anoxic Conditions Based on the low effluent $NH_4^+$—N concentration, both the continuous aeration and AAA processes performed quite well. However, if the effluent total nitrogen concentrations were examined, all the AAA processes, 2-hr on/2-hr off, 3-hr on/3-hr off, 4-hr on/4-hr off, 5-hr on/5-hr off, and 6-hr on/6-hr off (on: aeration on; off: aeration off or non-aeration), had lower effluent total integer concentration than that of the continuous aeration process. The effluent total nitrogen concentration obtains the most contribution from $NO_3^-$—N. Since both the continuous aeration and AAA processes had low effluent $NH_4^+$—N and $NO_2$—N removal concentrations, it implied that in the AAA process, $NO_3$—N had been denitrified at the non-aeration stage and removed from the system. The combination of nitrification and denitrification in the AAA process thus proved to have the added advantage of removing ammonium as well as total nitrogen ($NH_4^+$—N, $NO_2^-$—N and $NO_3^-$—N) over conventional nitrification methods. As well, the data supported the BFD reactor as a feasible and contributive to the performance of the AAA system.

Quantitative analysis of denitrification can be done by using a nitrogen balance which is established by the following equation.

(feed $NH_4^+$—N)*(feed rate)=(effluent $NH_4^+$—N+$NO_2^-$—N+$NO_3^-$—N)* (effluent rate)+(effluent VSS)*(14/113)*(effluent rate)

Since feed rate equals effluent rate, the above formula can be simplified as influent $NH_4^+$—N=[(effluent $NO_2^-$—N+$NO_2^-$—N+$NH_4^+$—N) or (effluent n=total nitrogen)]+(effluent VSS)*14/113

The continuous aeration process gave a good balance of the nitrogen concentrations: influent $NH_4^+$—N, approximately 15 mg/l, effluent total nitrogen, in the range of 12 to 13 mg/l, MLVSS, at the average of 8 mg/l. Any deviation from the balanced nitrogen equation in the AAA process indicates the production of nitrogen gas from denitrification.

Organic carbon, $C_6H_{12}O_6$—C in this experiment, had two outcomes in the AAA process. First, it was biologically oxidized at the aeration stage in the presence of oxygen and microorganisms. Secondly, organic carbon was one of the substrates for heterotrophic denitrifying bacterial. Based on the following denitrification reaction:

$NO_2^-$—N+2$C_6H_{12}O_6$—C+H$^+$→0.5$N_2$+1.25$H_2CO_3$+0.5$H_2O$, 1 mg $NO_3^-$—N will react with 1.07 mg $C_6H_{12}O_6$—C. If 1 mg $NO_3^-$—N is completely converted from the same amount of $NH_4^+$—N, it indicates that for treating 1 mg $NH_4^+$—N by the AAA process, at least 1.07 mg $C_6H_{12}O_6$—C is required in the system. Because of these two outcomes for organic carbon in the AAA process, the AAA process achieved TOC removal efficiencies comparable to those of the continuous aeration process.

A series of kinetic studies were done on the aeration modes of 3-hr on/3-hr off, 4-hr on/4-hr off, 5-hr on/5-hr off, and 6-hr on/6-hr off, to determine optimal on/off timing. A common characteristic of the kinetics of the AAA process was found among those different aeration modes. At the beginning of each cycle (aeration on), nitrate (coming from oxidation of $NH_4^+$—N or nitrification) began to accumulate in the system and its concentration in the effluent was increased. During the same period, nitrite low concentration was low, indicating its transience in the nitrification process. The concentrations of $NH_4^+$—N stayed low (around 2 mg/l) because of nitrification.

As the non-aeration period started, theoretically, nitrate concentration was expected to drop due to denitrification, and ammonium was expected to accumulate because no nitrification takes place. However, these phenomena were not immediately observed as the air pump was shut off, since previous aeration caused the system to be saturated with dissolved oxygen and thus allowed nitrification to go on after aeration was terminated. It took about 1 to 2 hours for the dissolved oxygen in the reactor to be depleted, and for the denitrification process to take over. From this point on, the nitrate concentration started to decrease and the ammonium concentration increase. Meanwhile, the nitrite concentration exhibited a bi-phasic response, rising first but eventually dropping, indicating that nitrite was only a transient product of the denitrification process. It was found that a 2-hour non-aeration period might not be long enough for the denitrification process to start or fully function. With an influent containing 50 mg/l TOC and 15 mg/l $NH_4^+$—N, there was little difference among the carbon and nitrogen removal efficiencies by the aeration modes of 3-hr on/3-hr off, 4-hr on/4-hr off, 5-hr on/5-hr off, and 6-hr on/6-hr off. Since all these processes had an aeration/non-aeration ratio of 1, further studies were undertaken to investigate the effect of ratios other than 1.

Other parameters were investigated, including anoxic TOC removal. The formulae derived from an analogous procedure to the technique of estimating the dead volume in a CFSTR (continuous-flow, stirred-tank reactor) system were applied. Equations are as follows.

Anoxic TOC removal rate in the AAA Process: The CFSTR dilution curve was used to predict the effluent TOC concentration at time $t_i$, $C_p(t_i)$, with the assumption that the organic carbon does not undergo any reaction:

$$C_p(t_i) = C_l - (C_l - C_g)\exp\left(\frac{t_i}{\theta}\right), i = 0, 1, 2, \ldots n-1$$

where θ is the reactor empty bead hydraulic reunion time, hour, and $t_0$=0. The difference between $C_p(t_i)$ and $C_0(t_i)$, the effluent TOC concentration observed at time $t_0$, is taken as the TOC removed at time $t_n$.

$$C_p(t_i)=C_p(t_i)-C_0(t_i)$$

The anoxic TOC removal rate over a time interval ($t_i$, $t_{i-1}$), $U_{anoxic}(t_{i-1})$, is calculated as:

$$U_{anoxic}(t_i) = \frac{[C_R(t_{i+1}) - C_R(t_i)]}{[AVSS \times (t_{i+1} - (t_i)]}$$

where AVSS is the attached volatile suspended solids, mg/l. The more anoxic TOC removal rate, $U_{anoxic}$ is calculated as:

$$U_{anoxic} = \frac{\sum U_{anoxic}(t_{i-1})}{n}$$

Nitrification Rate in the AAA Process: The formula predicting the disappearance of $NO_3^-$—N from the system, where nitrification is assumed not to take place, is used to predict the effluent $NO_3^-$—N from the system, where nitrification is assumed to take place, is used to predict the effluent $NO_3^-$—N concentration at time $t_0$, n−1, $N_p(Ti)$:

$$N_p(t_i) = N_0 \exp\left(-\frac{t_i}{\theta}\right), i = 0, 1, 2, \ldots n-1$$

where $N_0$ is the effluent $NO_3^-$—N concentration at time $t_p$, $N_p(i_1)$ is:

$$N_p(t_i) = N_0(t_i) - N_p(t_i)$$

where $N_0(t_i)$ is the effluent $NO_3^-$—N concentration observed at time $t_i$, mg/l. The nitrification rate over a time interval $(t_i, t_{i-1})$, $U_N(t_{i-1})$, is calculated as:

$$U_N(t_{i-1}) = \frac{[N_g(t_{i+1}) - N_R(t_i)]}{[AVSS \times (t_{i+1} - (t_i))]}$$

The mean nitrification rate, $U_N$, is calculated as $$U_N = \frac{\sum U_N(t_{i-1})}{n}$$

Denitrification Rate in the AAA Process: The formula predicting the disappearance of $NO_3$—N from the system, where denitrification is assumed not to take place, is used to predict the effluent $NO_3^-$—N concentration at time $t_0$, $N_p(t_0)$:

$$N_p(t_i) = N_0 \exp\left(-\frac{t_i}{\theta}\right), i = 0, 1, 2, \ldots n-1$$

The $NO_3^-$—N concentration consumed by denitrification at time $t_0$, $N_p(t_0)$ is:

$$N_R(t_i) = N_P(t_i) - N_0(t_i)$$

The denitrification rate over a time interval $(t_i, t_{i-1})$, $U_{DN}(t_{i-1})$, is calculated as:

$$U_{DN}(t_{i-1}) = \frac{[N_g(t_{i+1}) - N_R(t_i)]}{[AVSS \times (t_{i+1} - (t_i))]}$$

The mean denitrification rate, $U_{DN}$, is calculated as:

$$U_{DN} = \frac{\sum U_N(t_{i+1})}{n}$$

Note that the nitrification rate and the denitrification rates discussed herein are the nitrate production rate and the nitrate reduction rate, respectively. These rates may appear in some other cases with different units or definitions. Reaction rates also vary depending upon reaction conditions.

Example 4

Removal of a Nitrogen-Containing Organic Chemical from Aqueous Waste Under Alternating High-Oxygen and Anoxic Conditions The feasibility of using the AAA process to remove more complicated toxic compounds containing both nitrogen and organic carbon was tested. As shown above by both the theory and experimental data, the AAA process can not only deal with nitrogenous compounds (especially $NH_4^+$, $NO_2^-$ and $NO_3^-$) but at the same time remove the organic carbon. Both effects lead to the potential broad application of the AAA process. Secondly, an internal carbon source means no need for external carbon usage and thus reduces the operating cost. When a compound consisting of both nitrogen and organic carbon undergoes a denitrification reaction, the biodegradability of the organic carbon becomes critical to the denitrification rate.

Compared with glucose, the aromatic structure of aniline makes itself somehow difficult to decompose. Therefore, a lower denitrification rate is expected in the AAA process. Reduced denitrification efficiency results in a need for a longer non-aeration duration for sufficient denitrification, thus requiring a lower aeration/non-aeration ratio. Different aeration/non-aeration ratios, including 1, >1, and <1, were tested for the optimal performance of the AAA process. The performances of two AAA processes on different influent contents (one is glucose plus $NH_4^+$ and the other is aniline) was also compared.

Experimental material and analytical equipment: In addition to the materials and methods listed in previous Examples, some changed or added items are described below.

Ammonia Ion Selective Electrode: The ammonia probe provides an alternative to DR/4000 Spectrophotometer for a quicker analysis of ammonium concentration. This gas-sensing probe by Accumet utilizes a pre-bonded semi-permeable membrane cap which separates the electrodes' internal fill solution from the sample solution. The outer body is constructed of durable, break-resistant polypropylene. As EA 920 Expandable Ion Analyzer by ORION is chosen as the measuring meter.

Rapid Distillation Apparatus: The Labconco (Kansas City, Mich.) Rapid Distillation Apparatus is designed expressly for rapid, semi-automatic steam distillation from sulfuric acid digest prepared from nitrogen-bearing materials such as feeds, grains, soils, water effluent, organic waste, etc. It can be used for micro or macro levels of nitrogen determination.

The experimental procedures were as described above. The main constituent of the influent was $C_6H_5NH_2$, which has the carbon/nitrogen ratio of 74/14. No external organic carbon source was added. Total Kjedahl nitrogen (TKN), a measure of the total organic and ammonia nitrogen, was measured to determine the influent organic carbon and its fate in the AAA process. Two influent aniline concentrations were applied to the AAA process. For each concentration, different aeration/non-aeration ratios were tested. As before, the composite effluent concentrations of TOC, $NH_4^+$—N, $NO_2^-$—N and $NO_3^-$—N were measured daily and the kinetic study was conducted for detailed data of nitrification and denitrification mechanisms. Batch experiments of toxic TOC removal and anoxic denitrification were used to examine any inhibition effects by aniline.

Although the influent contained mainly aniline and mineral nutrients, there was still trace amount of free $NH_4^+$ detected in the influent. These low concentrations were deducted from both sides of the nitrogen balance to exclude their effects. Influent TOC and organic nitrogen was detected at a stable ratio (theoretically, C/N: 72/14) as the chemical structure of aniline indicates. In the case of continuous aeration with an influent concentration of approximately 18 mg/l org N and 1 mg/l $NH_4^+$—N, a balanced nitrogen conversion was established by effluent 17 mg/l total nitrogen, 0.4 org. N and 20–30 mg/l MLVSS. For the results of the AAA process, the deficit in the nitrogen balance equation indicated that part of the influent aniline was successfully removed as nitrogen gas. As the aeration/non-aeration ratio dropped from 6-hr on/6-hr off, 4-hr on/6-hr off, 4-hr on/8-hr off to 4-hr on/10-hr off, the effluent total nitrogen was correspondingly decreased, or the total nitrogen removal efficiency was improved. The kinetic study of 6-hr on/6-hr off showed that denitrification of nitrate and nitrite was interrupted by termination of non-aeration period and only 40% of total nitrogen was removed. Therefore, an aeration/non-aeration ratio less than 1 will allow longer non-aeration period to denitrify accumulated $NO_3^-$—N from the aeration stage and improve the total nitrogen removal efficiency. However, the compensation for extended non-aeration period was accumulation of effluent aniline.

The aeration/non-aeration regimen of 4-hr on/4-hr off, with the ratio of 1, had very different kinetic results from the other AAA processes tested. $NO_2^-$—N was the main effluent constituent through the whole AAA process, while $NH_4^+$ and $NO_3^-$—N were at low concentrations. One proposed mechanism for this phenomenon was that both aeration and non-aeration periods were insufficient for complete nitrification and denitrification processes, thus leading to a bypass from $NH_4^+$—N to $NO_2^-$—N and finally nitrogen gas.

Higher aniline concentrations were also tested, with two aeration/non-aeration ratios. Both 6-hr on/6-hr off and 9-hr on/9-hr off had TOC removal efficiencies of over 90%. The total nitrogen removal efficiency of 9-hr on/9-hr off was lower than that of 6-hr on/6-hr off. Compared with lower concentrations, the AAA process still has excellent carbon and nitrogen removal performance of higher influent aniline concentrations.

Studies show that biological transformation of aniline involves, at the early stage, carbonaceous removal by heterotrophic bacterial (under toxic conditions) and at the same time releasing $NH_4^+$—N. $NH_4^+$ is then removed by nitrification and denitrification as usually seen in the AAA process. It has also been demonstrated that a high initial aniline concentration does not affect the heterotrophic activity (toxic aniline degradation to release $NH_4^+$). A kinetic study of batch nitrification under toxic conditions, discussed in the thesis on which the present invention is based (see supra), shows that aniline is degraded at a high concentration such as 25 mg/l TOC. However, aniline is too toxic to nitrify microorganisms and their activities are reduced by increased aniline concentrations. The effect of high initial concentrations of 250 and 425 mg/l aniline in an activated sludge system has been described: although the aniline concentration falls very rapidly, effective nitrification does not take place at 26 hours. As a result, upper limits should be put on the influent aniline concentrations for an efficient AAA process. An anoxic batch experiment of aniline showed extremely slow denitrification process (reduction of $NH_4^+$—N and $NO_3^-$—N) on various initial aniline concentrations from a low of under 20 mg/l TOC to a high of 100 mg/l TOC. It demonstrated the low biodegradability characteristics of aniline, and further that no obvious inhibition of denitrification rates by aniline were observed in that range of initial aniline concentrations.

Having now fully described the present invention in some detail by way of illustration and example for purposes of clarity of understanding, it will be obvious to one of ordinary skill in the art that same can be performed by modifying or changing the invention with a wide and equivalent range of conditions, formulations and other parameters thereof, and that such modifications or changes are intended to be encompassed within the scope of the appended claims.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. An aquaculture system comprising:
   (a) an aqueous environment;
   (b) a means for fluidly connecting said aqueous environment with a biofilter system, said biofilter system comprising:
      (i) a main biofilter chamber having an inlet port and an outlet port and containing therein aerobic and anaerobic bacteria without physical separation; and
      (ii) a means for oxygenating said aerobic and anaerobic bacteria in said main biofilter chamber, including means for timing the oxygenation of said aerobic and anaerobic bacteria;
   (c) a means for disinfecting an outflow of said biofilter system; and
   (d) a means for returning said disinfected outflow to said aqueous environment.

2. The aquaculture system of claim 1, wherein said aquaculture system further comprises a pump.

3. The aquaculture system of claim 1, wherein said aquaculture system further comprises a means for filtering an outflow from said aqueous environment.

4. The aquaculture system of claim 1, wherein said aqueous environment is a tank.

5. The aquaculture system of claim 1, wherein said aqueous environment is a natural or a man-made pond.

6. The aquaculture system of claim 1, wherein said aqueous environment is a natural or a man-made lake.

7. The aquacultrue system of claim 1, wherein said aqueous environment is a cage system on a river, a near-shore area and/or a fjord.

8. A method of aquaculture, wherein fish are grown in said aqueous environment of claim 1.

9. A system for treating animal waste comprising:
   (a) a first vessel having a first inlet port and a first outlet port, wherein said first vessel contains means for degrading animal waste solids within said animal waste and means for separating animal waste solids and animal waste liquid; and;
   (b) a second vessel comprising a biofilter system wherein an inlet port of said biofilter chamber is fluidly connected to said first outlet port of said first vessel, and wherein said biofilter system comprises:
      (i) a main biofilter chamber having an inlet port and an outlet port and containing therein aerobic and anaerobic bacteria without physical separation; and
      (ii) a means for oxygenating said aerobic and anaerobic bacteria in said main biofilter chamber, including means for timing the oxygenation of said aerobic and anaerobic bacteria.

10. The system for treating animal waste of claim 9, wherein an effluent from said first vessel is aqueous.

11. A method of removing carbonaceous matter, nitrogenous matter, or mixtures thereof from animal waste, comprising passing said animal waste through said system for treating animal waste of claim 9.

12. The method for removal of claim 11, wherein an amount of said carbonaceous matter, nitrogenous matter, or mixtures thereof in said outflow is reduced by no less than approximately 80% from an original amount of said carbonaceous matter, nitrogenous matter, or mixtures thereof in said liquid portion of said animal waste.

13. The method for removal of claim 12, wherein the amount of said carbonaceous matter, nitrogenous matter, or mixtures thereof in said outflow is reduced by no less than approximately 90% from the original amount of said carbonaceous matter, nitrogenous matter, or mixtures thereof in said liquid portion of said animal waste.

14. The method for removal of claim 11, wherein said animal waste is produced by any one of a pig, a horse, a goat, a sheep, a cow, a chicken, a turkey, an ostrich, an emu, a llama or an alpaca.

15. The method for removal of claim 11, wherein said animal waste comprises no more than approximately 10% solid animal waste.

16. The method for removal of claim 15, wherein said animal waste comprises no more than 5% solid animal waste.

17. The method for removal of claim 16, wherein said animal waste comprises no more than approximately 1% solid animal waste.

* * * * *